Aug. 14, 1923.
C. W. MOTT
1,464,996
ENGINE
Filed Nov. 28, 1919   3 Sheets-Sheet 3
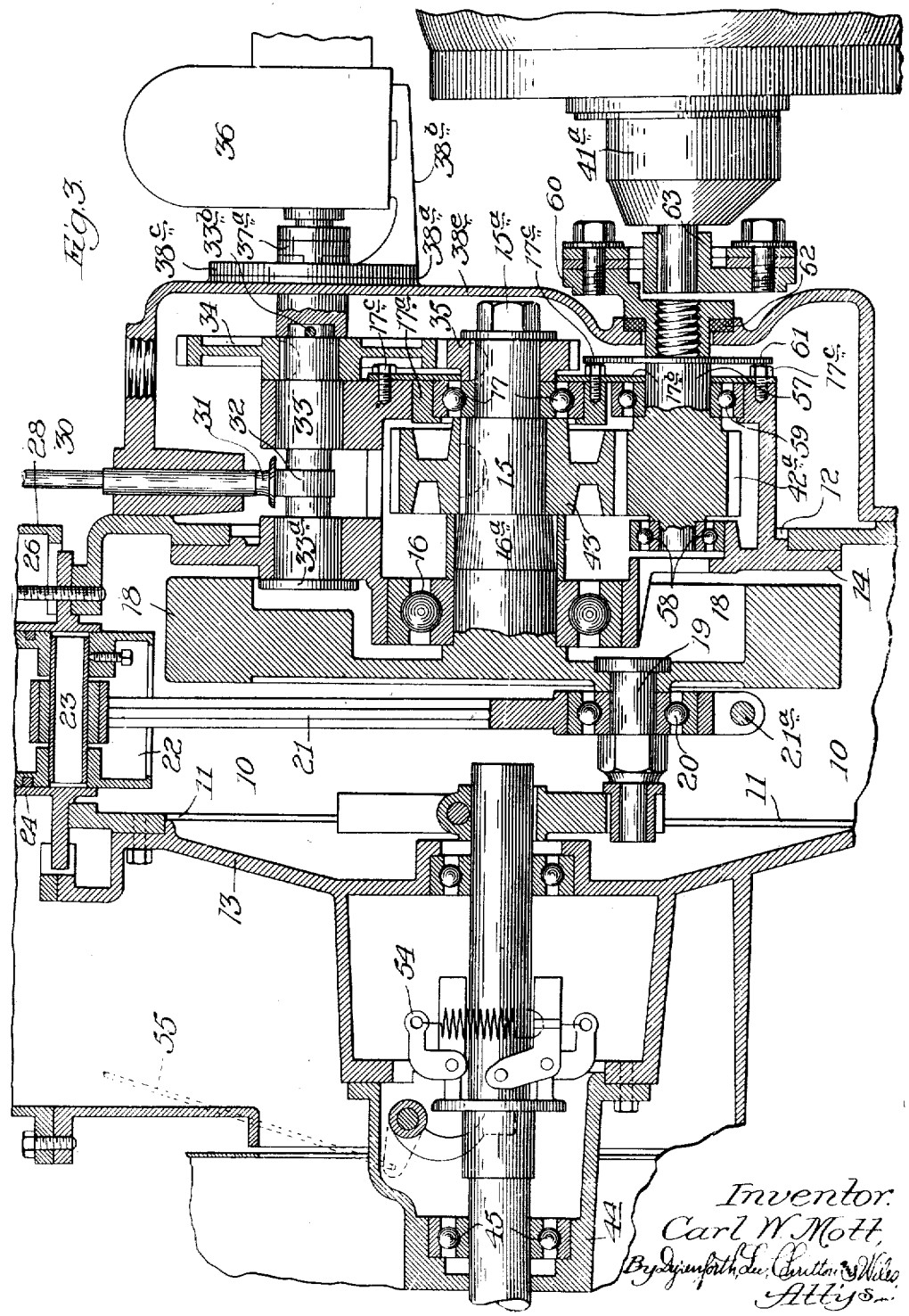
Inventor.
Carl W. Mott,
By Dyrenforth, Lee, Chritton & Wiles
Attys.

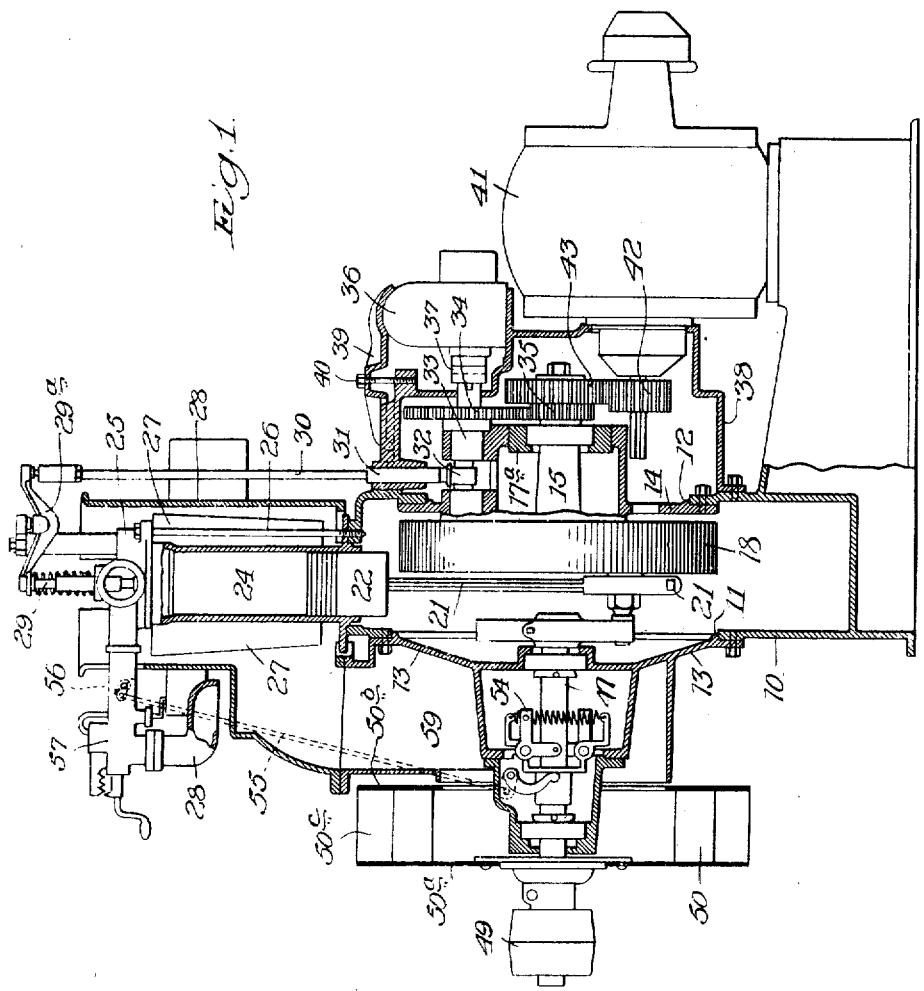

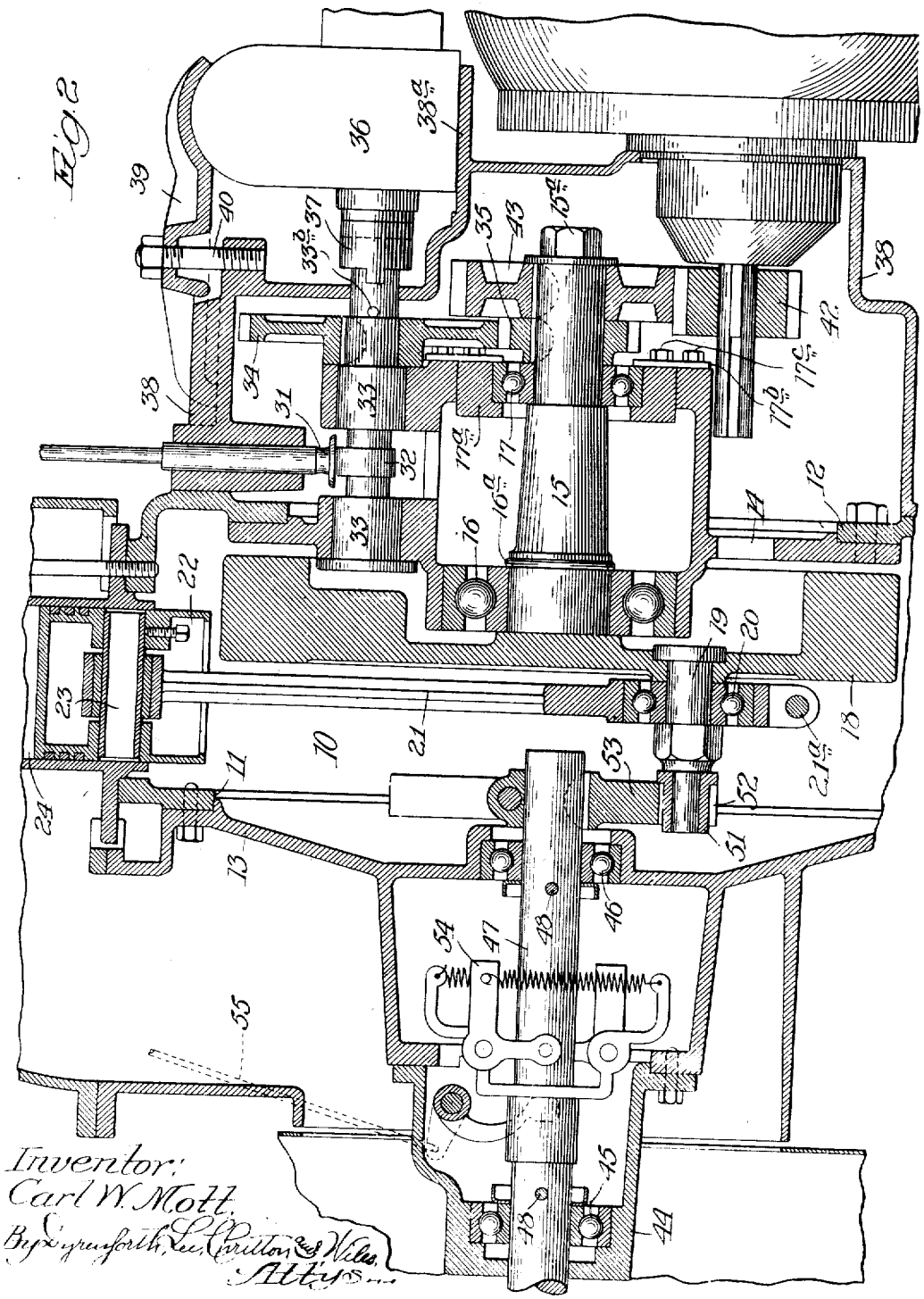

Patented Aug. 14, 1923.

1,464,996

UNITED STATES PATENT OFFICE.

CARL W. MOTT, OF STERLING, ILLINOIS, ASSIGNOR TO FORT DEARBORN MANUFACTURING CO., OF STERLING, ILLINOIS.

ENGINE.

Application filed November 28, 1919. Serial No. 341,058.

*To all whom it may concern:*

Be it known that I, CARL W. MOTT, a citizen of the United States, residing at Sterling, in the county of Whiteside and State of Illinois, have invented new and useful Improvements in Engines, of which the following is a specification.

My invention relates to new and useful improvements in engines and particularly in internal combustion engines, and is fully described in the following specification and shown in the accompanying drawings, in which—

Figure 1 is a vertical longitudinal section of an engine embodying my invention.

Figure 2 is a partial enlarged section on the same plane as Fig. 1; and

Figure 3 is the same but shows a modified but preferred form of the invention.

This invention is closely related to the invention disclosed in my co-pending application Serial No. 333,468, filed October 27, 1919.

I have illustrated my present invention in connection with an internal combustion engine having a crank case 10 having large side openings 11 and 12 in which are secured cover-plates 13 and 14, respectively. The latter carries the crank shaft 15 which I have preferably journaled in two ball-bearings 16 and 17, the former being mounted in a housing forming a part of the cover-plate. This bearing has only the inner race held preferably by means of a press fit and a wire ring 16ª, and is therefore free to align itself in its housing. The bearing 17 is mounted in a housing 17ª and has its inner and outer races secured, respectively, to the shaft by the cap-screw 15ª and to the housing 17ª and the cover-plate 14 by the ring 17ᵇ and the screws 17ᶜ so that it is held against endwise thrust in either direction.

The shaft 15 carries the flywheel 18 which I have preferably cast integral therewith. The wrist-pin 19 passes through the flywheel and the inner race of the ball-bearing 20, thereby securing the inner race to the fly-wheel. A connecting rod 21 has its lower end secured to the outer race of the ball bearing 20 by means of a split end, a bolt 21ª and a notched washer. The other end is connected to the piston 22 by a piston pin 23. The piston reciprocates in the cylinder 24 which has a cylinder head 25. Both are preferably held in assembled position by four bolts 26, which are screwed into the crank-case casting.

The cylinder has a series of longitudinal fins 27 cast thereon and is surrounded by a jacket 28 through which air for cooling the cylinder is drawn, as will later be explained. This jacket is bolted to the casting forming the cover plate 13.

The inlet valve (not shown) is preferably automatically operated while the exhaust valve 29 is operated by means of rocker arm 29ª, a valve rod 30 and the mushroom follower 31 from a cam 32 on the cam-shaft 33 which is preferably driven at half crank shaft speed by the gears 34 and 35 keyed on the cam shaft and crank shaft respectively. The cam shaft has two enlarged bearing surfaces which are journaled in the casting forming the cover plate 14, and which are large enough to permit the cam 32 to be inserted and withdrawn endwise. A head 33ª on one end of a pin 33ᵇ behind the gear 34 prevent endwise movement.

A magneto 36 is driven from the cam shaft by means of a coupling 37, and is supported on a bracket 38ª which is part of the housing 38, and is held in place by a clip 39 and a stud 40. The housing 38 surrounds the gears and is bolted to the crank case 10.

The crank case casting also acts as a base and supports a generator 41 which is driven from the crank-shaft through the gears 42 and 43 which are keyed to the generator shaft and crank shaft, respectively.

Bolted to the cover plate 13 is a housing 44. These carry ball-bearings 45 and 46 and each has a shoulder adapted to receive the endwise thrust of the outer race. The inner races carry a fan shaft 47 which is secured thereto in any suitable way as by means of pins 48. This shaft carries a drive pulley 49 and a fan 50 preferably of the Sirocco type having a closed side 50ª, a side 50ᵇ having a central opening for the air and curved peripheral blades 50ᶜ. The fan shaft is driven from the crank pin 19 through the bushing 51 which is slidable in a slot 52 in an arm 53 which is keyed to the fan shaft.

In Fig. 3 I have shown a modified but preferred form of my invention, in which the magneto 36 is mounted on a bracket 38ᵇ having a disk-like plate 38ᶜ covering the circular opening 38ᵈ in the housing 38ᵉ. The magneto is preferably driven from the cam shaft by means of a flexible coupling 37ª.

In either case the importance of my construction is that the magneto can be mounted on the bracket 38$^b$ and assembled or disassembled as a unit and without disturbing any other parts.

In this form I have also placed the gear 43 between the bearings 16 and 17 and have made it smaller than the casing of the bearing 16, so that it can be assembled or disassembled as a unit with the shaft 15 and the bearings 16 and 17. The gear 43 meshes with the gear 42$^a$ on the intermediate shaft 57 which is journaled in the ball-bearings 58 and 59, the latter being retained by the plate 17$^b$. The shaft 57 preferably has a shouldered and threaded extension on which is screwed one element 60 of a flexible coupling. An oil disk 61 is held between the shoulder and said element and picks up oil and delivers it to the gear 35. A felt washer 62 surrounds the coupling element 60 and is held between a shoulder thereon and a counter-bow in the housing 38$^e$. The corresponding coupling element 63 is keyed to the armature shaft of the generator 41$^a$.

The fan shaft also carries a governor 54 which operates through the governor rod 55 to control the throttle valve 56.

The cylinder is cooled by air drawn in from above it and between it and the jacket 28, thereby cooling the head 25 and the fins 27. This heated air then passes down through the passage surrounding the breather tube 59, into the center of the fan and out radially through the fan blades.

It will be apparent to anyone skilled in this art that the construction and method of mounting and assembling the crank-shaft and associated parts is novel and that it combines in this engine the splendid wearing qualities of ball-bearings with a mounting which is easy to assemble and adjust and economical of manufacture.

This engine particularly adapts itself to a standardization of interchangeable parts and to assembly by units. The crank-shaft and cam shaft are assembled at a bench and mounted in the crank case as a unit. The cylinder, piston and connecting rod are mounted as a unit. The fan shaft is assembled and mounted as another unit. The carbureter, magneto and generator are mounted as separate and complete units. Owing to the method of mounting the fan shaft, the magneto and the intermediate shaft, any slight variation in alignment due to manufacture will be taken care of.

While I have shown and described but two embodiments of my invention, it is to be understood that it is capable of many modifications. Changes therefore in the construction and arrangement may be made without departing from the spirit and scope of the invention as disclosed in the appended claims.

What I claim as new and desire to secure by Letters Patent is:

1. In an engine, a main frame, a cylinder attached thereto, an opening in said frame, a closure for said opening having anti friction bearings therein, a crank shaft in said bearings, gears on the crank shaft and a plurality of shafts geared thereto and journaled in said closure, all of said parts being assembled and adapted to be inserted in said opening as a unit.

2. In an engine, a main frame, a cylinder attached thereto, an opening in said frame, a closure for said opening having anti friction bearings therein, a crank shaft in said bearings, gears on the crank shaft, a plurality of shafts geared thereto and journaled in said closure, all of said parts being assembled and adapted to be inserted in said opening as a unit, a housing for said gears, openings therein for said last named shafts and a flexible coupling for connecting each of said shafts to a shaft to be driven thereby.

3. In an engine, a main frame, a cylinder attached thereto, an opening in said frame, a closure for said opening having anti friction bearings therein, a crank shaft in said bearings, a gear on said shaft between said bearings, and a shaft driven thereby having ball bearings carried by said closure, all said parts being assembled and adapted to be inserted in said opening as a unit.

4. In an engine, a crank case having a large and a small opening therein, a closure for the small opening, a shaft journaled therein and a flywheel on said shaft, said closure, shaft and flywheel being assembled and adapted to be inserted as a unit through said large opening.

5. In an engine, a crank case having a large and a small opening therein, a closure for the small opening, a shaft journaled therein, a flywheel on said shaft, said closure, shaft and flywheel being assembled and adapted to be inserted as a unit through said large opening, and a cover for said large opening.

CARL W. MOTT.